United States Patent
Stapler (10) Patent No.: US 9,975,410 B2
(45) Date of Patent: May 22, 2018

(54) SLIDING ROOF SYSTEM FOR AN AUTOMOTIVE VEHICLE

(71) Applicant: Waldemar Stapler, Boeblingen (DE)

(72) Inventor: Waldemar Stapler, Boeblingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days. days.

(21) Appl. No.: 15/446,267

(22) Filed: Mar. 1, 2017

(65) Prior Publication Data

US 2017/0259651 A1    Sep. 14, 2017

(30) Foreign Application Priority Data

Mar. 10, 2016 (DE) .................. 10 2016 203 934

(51) Int. Cl.
*B60J 7/05* (2006.01)
*B60J 7/02* (2006.01)
*B60J 7/043* (2006.01)
*B60J 7/057* (2006.01)

(52) U.S. Cl.
CPC .............. *B60J 7/024* (2013.01); *B60J 7/043* (2013.01); *B60J 7/05* (2013.01); *B60J 7/0573* (2013.01); *B60Y 2306/09* (2013.01); *B60Y 2400/41* (2013.01); *B60Y 2410/102* (2013.01)

(58) Field of Classification Search
CPC ..... B60J 7/05; B60J 7/053; B60J 7/057; B60J 7/024; B60J 7/043; B60J 7/0435
USPC ........................................ 296/221, 222, 224
See application file for complete search history.

(56) References Cited

U.S. PATENT DOCUMENTS

| 5,066,068 | A | 11/1991 | Suzuki et al. |
| 5,154,482 | A | * 10/1992 | Hayashi ................. B60J 7/0435 296/216.03 |
| 9,493,059 | B2 | 11/2016 | Heidan et al. |
| 2016/0107514 | A1 | 4/2016 | Heidan et al. |

FOREIGN PATENT DOCUMENTS

| DE | 39 10894 A1 | 11/1989 |
| DE | 10 2011 085 177 A1 | 4/2013 |
| EP | 3 009 283 A2 | 4/2016 |
| WO | WO 2008/049409 A1 | 5/2008 |

OTHER PUBLICATIONS

Search Report of European Patent Office issued in Application No. 17 15 7263 with English translation of category of cited documents dated Aug. 18, 2017 (8 pages).

* cited by examiner

*Primary Examiner* — Dennis H Pedder
(74) *Attorney, Agent, or Firm* — Flynn, Thiel, Boutell & Tanis, P.C.

(57) ABSTRACT

Sliding roof system for an automotive vehicle with a movable roof part which is displaceable relative to a vehicle-fixed roof frame module between a closed position, a ventilation position and an open position, and with a drive system including at least one carrier profile for displacing the roof part. A control lever is provided with at least one support roller which is supported on a floor of the guide rail arrangement, and the floor of the guide rail arrangement includes a seat into which the support roller plunges when the latching cam is received in the latching recess.

5 Claims, 6 Drawing Sheets

SLIDING ROOF SYSTEM FOR AN AUTOMOTIVE VEHICLE

CROSS-REFERENCE TO RELATED APPLICATIONS

This claims priority from German Patent Application No. 10 2016 203 934.2, filed on Mar. 10, 2016, the disclosure of which is hereby incorporated by reference in its entirety into this application.

FIELD OF THE INVENTION

The invention relates to a sliding roof system for an automotive vehicle with a movable roof part which is displaceable relative to a vehicle-fixed roof frame module between a closed position, a ventilation position and an open position, and with a drive system including at least one carrier profile fixedly connected to the roof part for displacing the roof part, and which is articulated to an equalizing lever on the front side, which lever is pivotably mounted on a front-sided bearing carriage and extends rearwards along a vehicle-fixed guide rail arrangement and is guided in a push guide of a drive carriage which is connected to a drive transmission means, and which includes a control lever mounted on a front side of the bearing carriage, entrainable by the drive carriage and extending rearwards along the guide rail arrangement, wherein the control lever includes a latching cam to be received in a latching recess of the guide rail arrangement in a form-fitting manner.

BACKGROUND OF THE INVENTION

A sliding roof system for an automotive vehicle is disclosed in DE 10 2011 085 177 A1. The sliding roof system includes a drive system in order to displace a respective carrier profile on each of opposite longitudinal sides of a movable roof part, whereon the movable roof part is attached. The drive system includes a respective drive carriage in the region of each of the two drive sides for the respective carrier profile, which carriage is in operative connection to a drive unit via a drive transmission cable. The carrier profile is associated with an equalizing lever which is displaceably guided on the drive carriage. On the rear side, the carrier profile is articulated to an intermediate lever which is pivotably connected to an auxiliary carriage. The auxiliary carriage and also the drive carriage are mounted for lengthwise movement in a guide rail arrangement.

SUMMARY OF THE INVENTION

It is the object of the invention to provide a sliding roof system of the type mentioned at the beginning which offers reliable functionality and allows low-noise displacement of the movable roof part between the closed position and the open position.

This object is achieved in that the control lever is provided with at least one support roller which is supported on a floor of the guide rail arrangement, and in that the floor of the guide rail arrangement includes a seat into which the support roller plunges in when the latching cam is received in the latching recess. The solution according to the invention allows, firstly, a secure supporting of the carrier profile, when the carrier profile together with the movable roof part is raised from the closed position to the ventilation position, or is lowered again from the ventilation position. Secondly, the support roller ensures that, during displacement of the drive carriage rearwards and a corresponding displacement of the roof part in the longitudinal direction of the guide rail arrangement, the latching cam does not drag along on the floor of the guide rail arrangement. What is achieved thereby is, firstly, a reduced noise production. Secondly, there is a considerable reduction of wear, in particular of the latching cam, obtained so that the functionality of the latching cam and the drive system is maintained even with a multitude of opening and closing cycles of the roof part. Finally, the control lever can be dragged with low friction, unless the drive carriage acts upon it. Advantageously, the drive system has two drive sides on opposite longitudinal sides of the movable roof part, each comprising a respective guide rail arrangement, a carrier profile, a drive carriage, an equalizing lever, a bearing carriage and a control lever. Moreover, each of the two drive carriages is lengthwise movable in the guide rail arrangement via a respective drive transmission means in the form of a flexible helix cable. The two drive transmission means are driven synchronously via a central drive unit. Both the drive sides have a functionally identical design. The functional components of the two drive sides, correspondingly present in pairs, are mirror symmetrical in relation to a vertical vehicle median longitudinal plane, however, for the rest have an identical design. The two guide rail arrangements are integrated in a roof frame module which is mountable fixed to the vehicle in the region of a roof opening portion of a vehicle roof of the automotive vehicle. In that context, the sliding roof system together with the roof frame module as a pre-assembled structural unit can be supplied to the roof zone and assembled there fixed to the vehicle. The solution according to the invention is particularly advantageous for employment in a roof zone of a passenger vehicle.

In an embodiment of the invention, the support roller is dimensioned and mounted on the control lever such that the latching cam is positioned contact-free with respect to a boundary surface of the guide rail arrangement when the support roller is supported on the floor of the guide rail arrangement. The latching recess for the latching cam can either be provided in the same plane of the guide rail arrangement as the recess for the support roller, or else in the region of another boundary surface of the guide rail arrangement. Advantageously, a contact and rolling surface of the support roller is spaced from the underside of the control lever such that the underside of the control lever actually does not slide along on the floor of the guide rail arrangement, but is carried by the support roller. On the other hand, the support roller is supported on the floor of the guide rail arrangement such that also the latching cam disposed on the control lever is carried freely and is not in contact with a corresponding boundary surface of the guide rail arrangement. The boundary surface of the guide rail arrangement can be the floor of the guide rail arrangement or can be any other boundary surface of another guiding plane of the guide rail arrangement. The latter arrangement can be provided when the latching recess for the latching cam is located in the region of a boundary surface of the guide rail arrangement other than the floor.

In a further embodiment of the invention, the control lever has a catch link on an end side, which is provided for receiving a control contour of the drive carriage, and the support roller is disposed adjacent to the catch link in the region of an underside of the control lever. Thereby, the support roller is positioned in the region of a rear-sided end of the control lever which is pivotably mounted on a front-sided end region.

In a further embodiment of the invention, the support roller has a rubbery-elastic outer jacket. The outer jacket is produced from an elastomer or a thermoplastic elastomer and can be applied to a carrier wheel of the support roller in the type of a hoop or ring. As an alternative, the rubbery-elastic outer jacket can be applied by a coating on an outer circumference of the carrier wheel. Owing to the rubbery-elastic outer jacket, firstly, a resilience and damping function for the control lever is achieved. Secondly, owing to the rubbery-elastic outer jacket, a rolling friction function in relation to the floor of the guide rail arrangement is improved, which floor preferably is made of a light metal alloy and, thus, is part of the guide rail arrangement produced from a light metal alloy.

In a further embodiment of the invention, the support roller is rotatably mounted in a bearing seat of the control lever by means of a bearing bolt. The bearing bolt is held in the bearing seat of the control lever in a force-fitting, form-fitting or material-bonding engagement.

Further advantages and features of the invention will become apparent from the claims and also from the description below of a preferred exemplary embodiment of the invention, illustrated with reference to the drawings.

DETAILED DESCRIPTION

Figure 1:
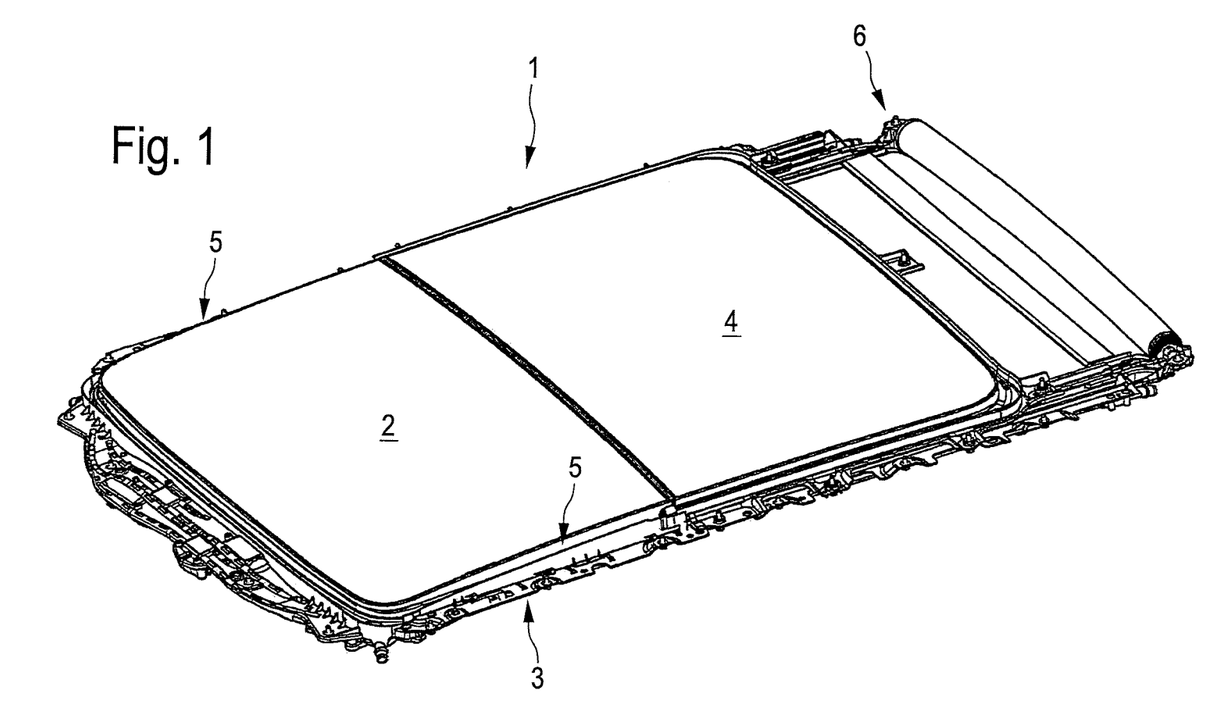
FIG. 1 shows a perspective view of an embodiment of a sliding roof system according to the invention.
Figure 2:
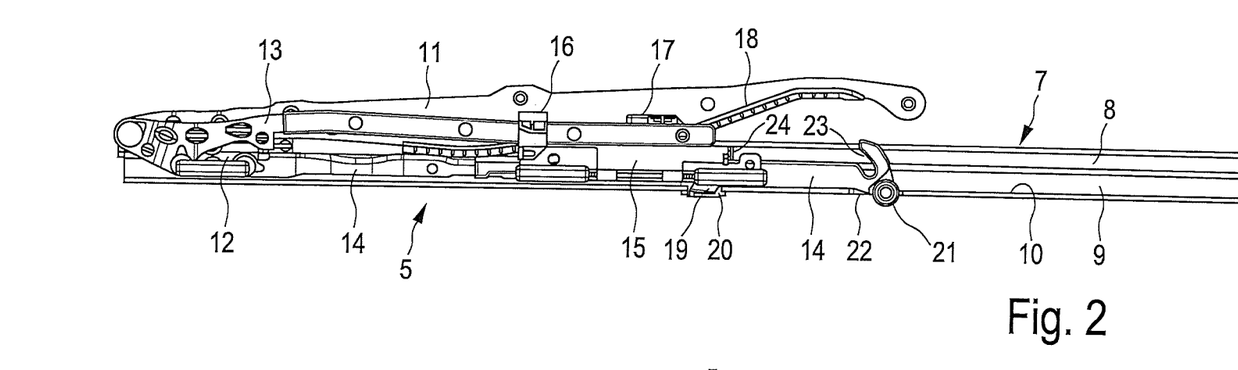
FIG. 2 shows a side view of a drive side of the sliding roof system according to FIG. 1.
Figure 3:
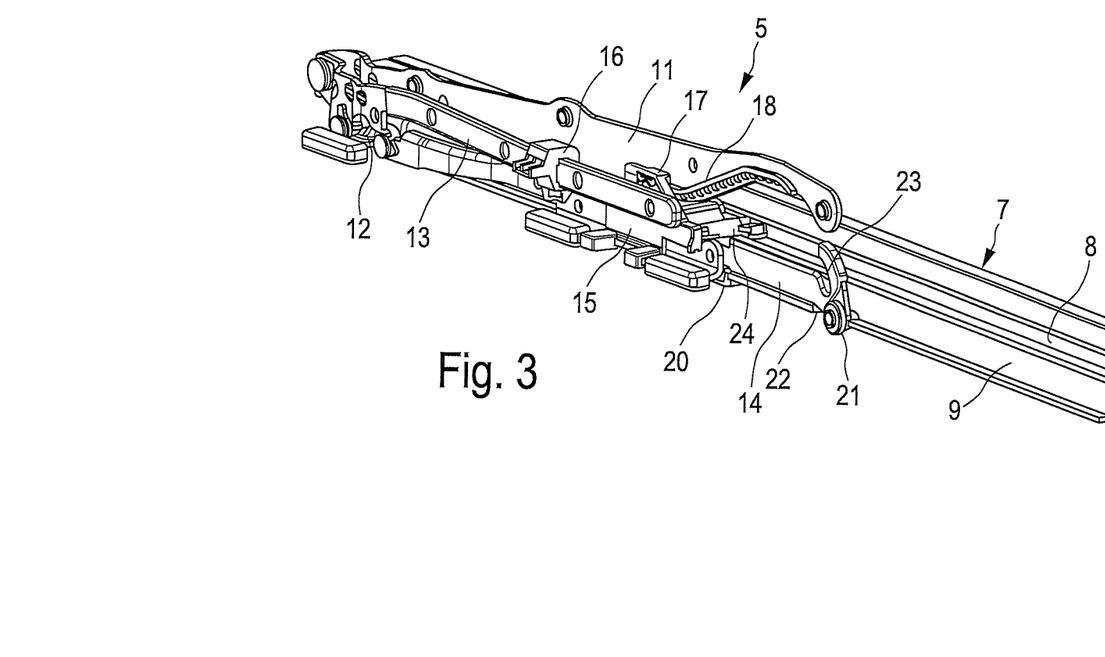
FIG. 3 shows the drive side according to FIG. 2 in a perspective view.
Figure 4:
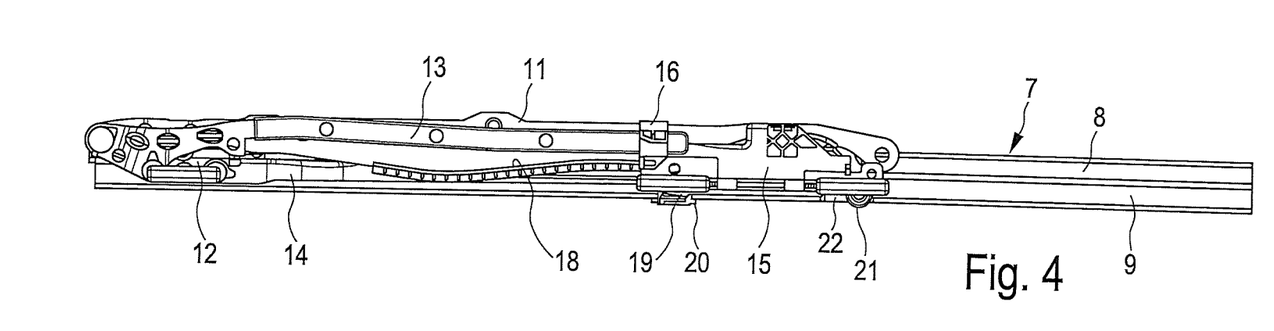
FIG. 4 shows the drive side of the sliding roof system according to FIG. 2 in a further functional position.
Figure 5:
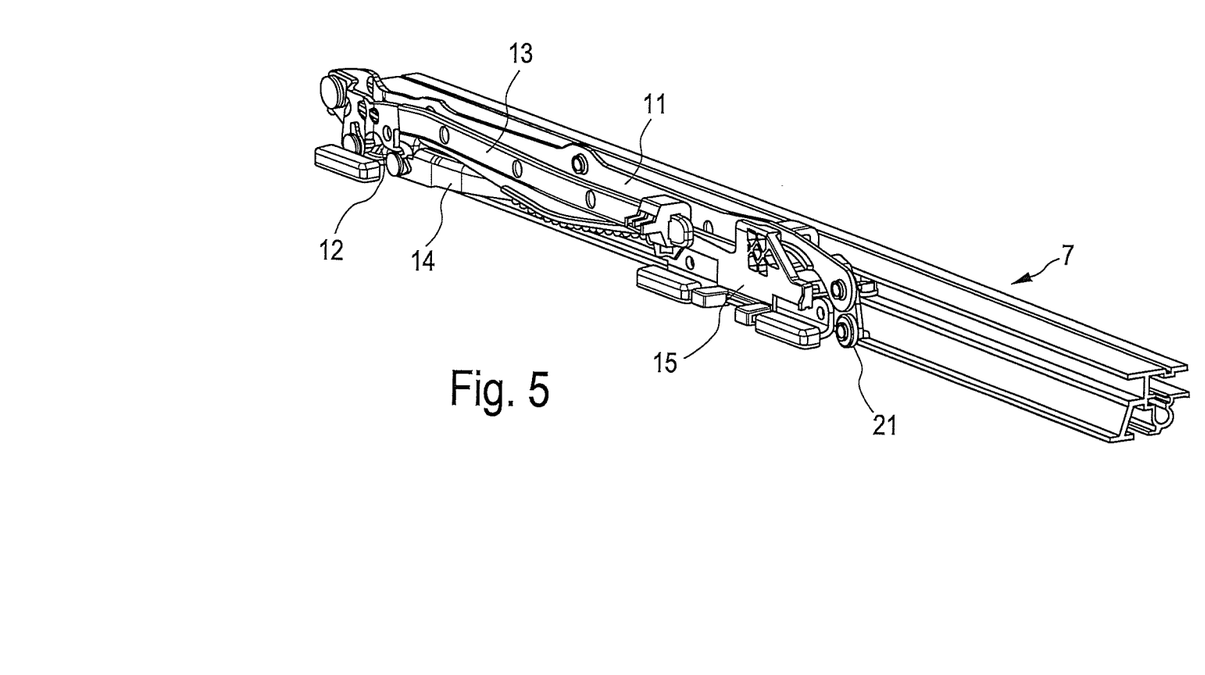
FIG. 5 shows the drive side according to FIG. 4 in a perspective view.
Figure 6:
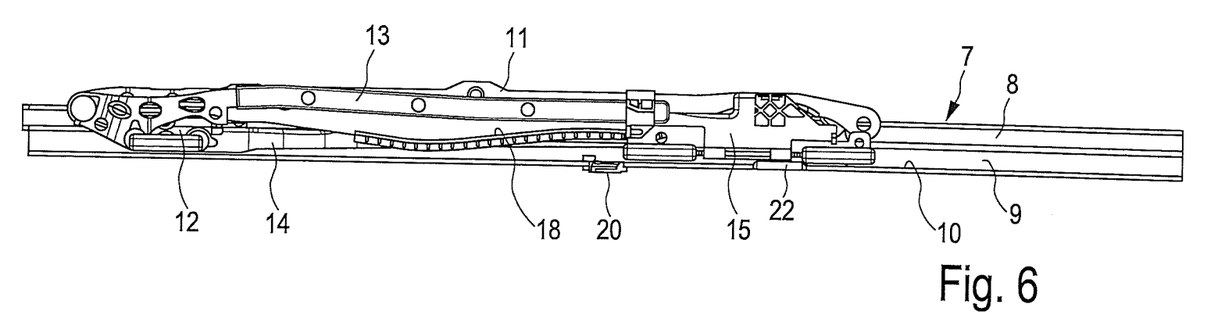
FIG. 6 shows the drive side according to FIGS. 2 and 4 in a further functional position, displaced to the rear in a vehicle longitudinal direction, as compared to the functional position according to FIG. 4.
Figure 7:
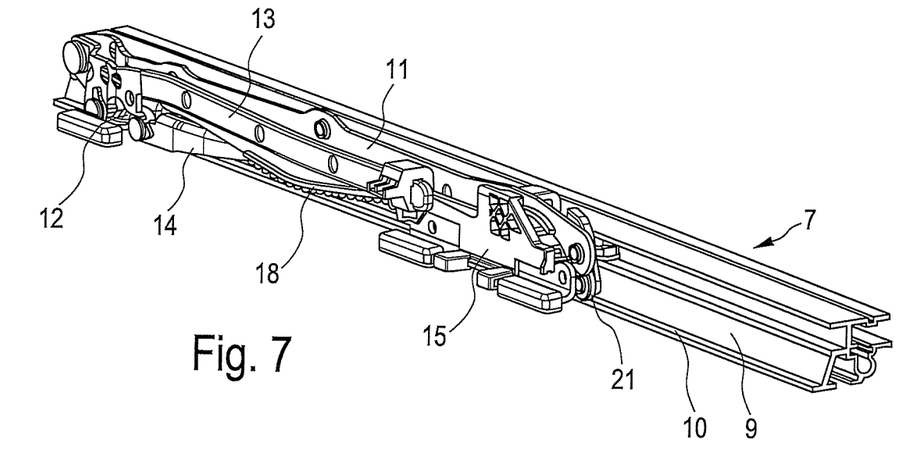
FIG. 7 shows the drive side according to FIG. 6 in a perspective view.
Figure 7A:
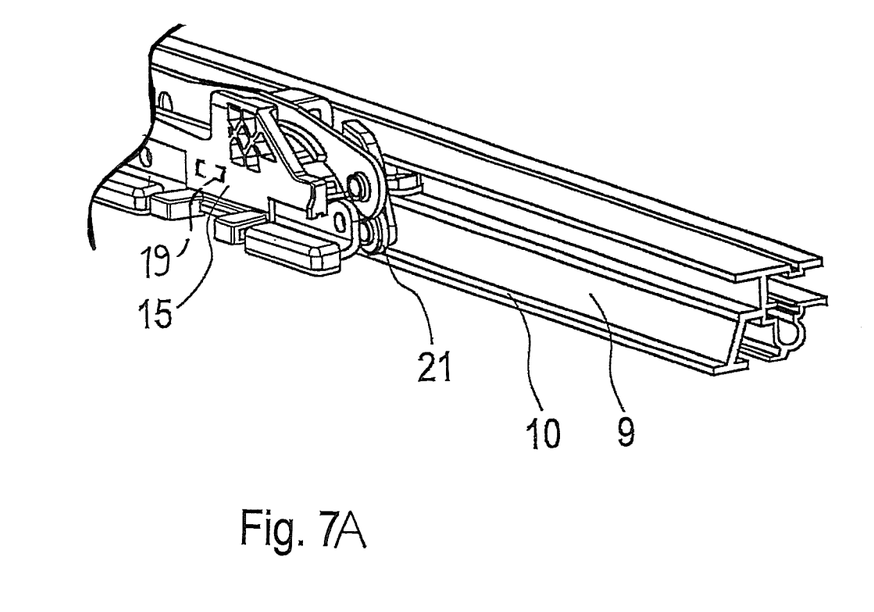
FIG. 7A is an enlarged fragmentary view similar to FIG. 7.
Figure 8:
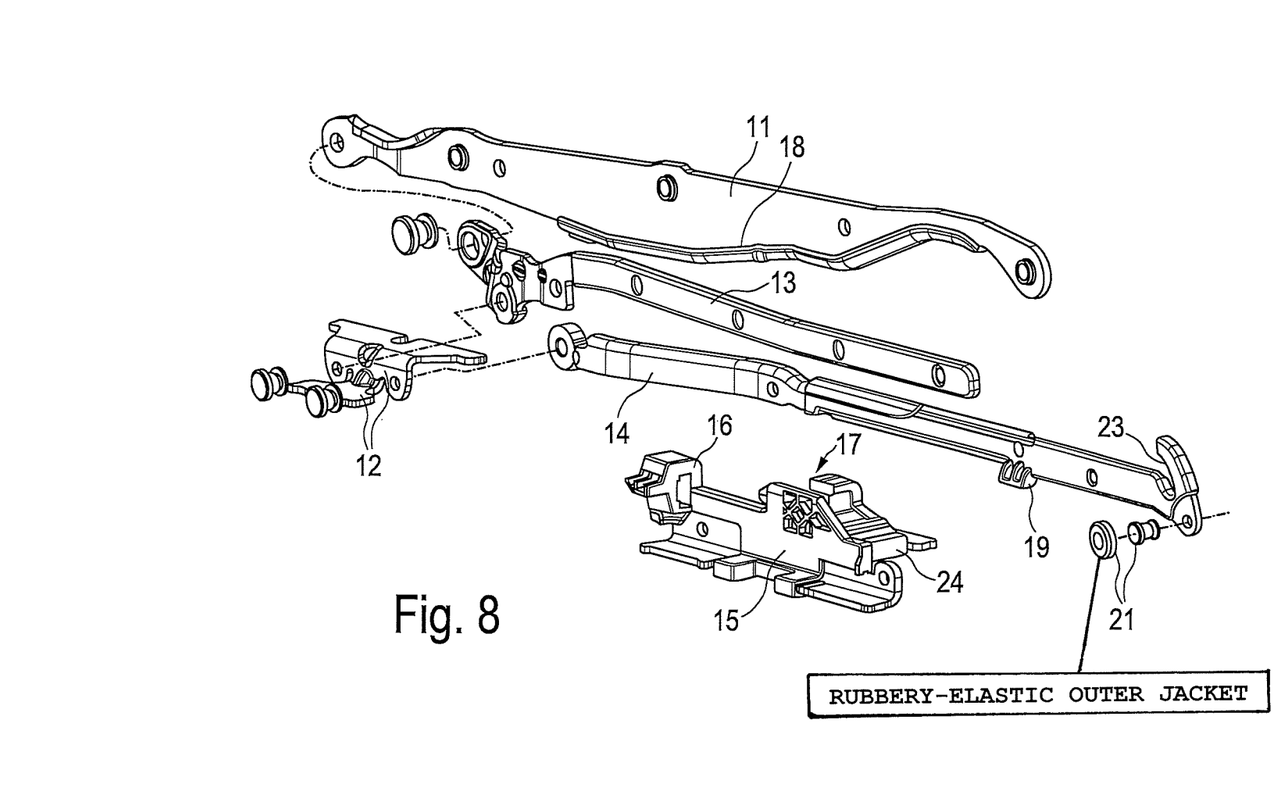
FIG. 8 shows the drive side according to FIGS. 2 to 7 of the sliding roof system according to FIG. 1 in a perspective exploded view.

A sliding roof system 1 according to FIGS. 1 to 8 includes a movable roof part 2 to close a roof opening portion when in a closed position according to FIG. 1, which roof opening portion is provided within a roof frame module 3. The roof frame module 3 is intended to be mounted in a cut-out roof zone of a passenger vehicle in order to provide a vehicle interior of the passenger vehicle with a sliding roof system 1 capable of being opened. The roof frame module 3 is provided with a respective drive side 5 on each of its opposite longitudinal sides, which are part of a drive system, in order to transfer the movable roof part 2 from the closed position according to FIG. 1 to an obliquely upwards raised ventilation position and to an open position rearwardly displaced in the longitudinal direction of the vehicle. In the open position, the movable roof part 2 is positioned below a stationary roof section 4 of the roof frame module 3. On the rear side, the roof frame module 3 additionally has a shading device 6. The shading device 6 is provided because both the movable roof part 2 and the stationary roof section 4 are produced from an at least partially transparent glass material.

Each of the two drive sides 5 is embodied according to FIGS. 2 to 8, wherein with reference to FIGS. 2 to 8 a left drive side 5 is illustrated—as seen in the normal heading of the passenger vehicle. The opposite drive side 5 has a functionally identical design. Corresponding functional components of the right drive side 5 are mirror-symmetrical in relation to a vertical vehicle median longitudinal plane, however, for the rest are disposed and designed identical to the functional components of the left drive side 5. In the following, merely the left drive side 5—as seen in the normal heading of the passenger vehicle—will be described in more detail. The description applies similarly to the right drive side 5.

Both drive sides are activated synchronously via a central drive unit of the drive system, not illustrated in more detail. The central drive unit includes an electric motor accommodated in a front region of the roof frame module 3, with a gear mechanism associated therewith which acts synchronously on two drive transmission means in the form of flexible helix cables installed in the roof frame module 3 towards the opposite drive sides 5. Each helix cable is installed in the region of the corresponding longitudinal side of the movable roof part 2 and the roof frame module 3 in a respective guide rail arrangement 7 and is connected to a drive carriage 15 which is guided in the guide rail arrangement 7 for lengthwise movement in the longitudinal direction of the vehicle.

The drive side 5 includes a carrier profile 11 which is longitudinally extended and upright oriented and over almost a total length of the movable roof part 2 fixedly connected to a left side region of the roof part 2. Consequently, a displacement movement of the carrier profile 11 of each drive side 5 necessarily causes a corresponding displacement of the movable roof part 2. On the front side (in relation to an orientation in the longitudinal direction of the vehicle), the carrier profile 11 is pivotably connected to an equalizing lever 13. A corresponding pivot axis of the pivot articulation extends in the transverse direction of the vehicle. The equalizing lever 13 is pivotably mounted on a bearing carriage 12 by means of a further articulation point. The bearing of the equalizing lever 13 on the bearing carriage 12 is spaced towards the bottom and towards the rear in relation to the pivot articulation for the carrier profile 11. The bearing carriage 12 is mounted so as to be slidingly movable in the guide rail arrangement 7 for lengthwise shifting using corresponding sliding elements. In that context, the guide rail arrangement 7 includes two superimposed guide planes 8, 9, wherein the guide plane 8 is an upper guide plane and the guide plane 9 is a lower guide plane. The bearing carriage 12 is guided with an external sliding element in the lower guide plane 9 and with interior sliding elements in the upper guide plane 8. In a distance behind the bearing carriage 12, the drive carriage 15 is mounted in the guide rail arrangement 7 to be slidingly movable in a shifting motion. The drive carriage 15 also includes sliding elements which are guided in the lower guide plane 9 and further sliding elements which are guided in the upper guide plane 8. In analogy to the bearing carriage 12, also with the drive carriage 15 the external sliding elements are positioned in the region of the lower guide plane 9 and the interior sliding elements in the region of the upper guide plane 8. The equalizing lever 13 is shiftably guided in a push guide 16 of the drive carriage 15 essentially for linear movement. As a result, a relative mobility between the equalizing lever 13 and the drive carriage 15 is obtained. The drive carriage 15 embraces a control link 18 of the carrier profile 11 by means of a slotted guide mechanism 17, which is for raising and lowering the carrier profile 11 about the front-sided pivot axis on the equalizing lever 13. Consequently, the carrier profile 11 is supported on the drive carriage 15 at a distance from its front-sided pivot axis.

Moreover, a control lever 14 is articulated on the bearing carriage 12, which lever extends rearwards within the guide rail arrangement 7 in the vehicle longitudinal direction. The control lever 14 is mounted on the bearing carriage 12, on a bearing point located behind the articulation point for the equalizing lever 13, to be pivotable about a pivot axis extending in the vehicle transverse direction. The control lever 14 is to secure the bearing carriage 12 together with the equalizing lever 13 and the front end region of the carrier profile 11 against a displacement movement in the vehicle longitudinal direction, i.e., in the longitudinal direction of the guide rail arrangement 7, and to release the corresponding functional components for a displacement movement in the longitudinal direction, respectively. For that purpose, the control lever 14 has a latching cam 19 at a distance behind the bearing point, which cam plunges into a latching recess 20 in a floor 10 of the guide rail arrangement 7, in certain functional positions of the carrier profile 11 and the control lever 14. As a result, the control lever 14 is necessarily secured in a form-fitting manner against a displacement movement in the longitudinal direction of the guide rail arrangement 7. Thereby, the bearing carriage 12 is also blocked against a displacement movement in the longitudinal direction of the guide rail arrangement 7. Since the equalizing lever 13 is articulated on the bearing carriage 12 and the carrier profile 11 is articulated on the equalizing lever 13, the carrier profile 11 is also secured against a displacement movement rearwards in the vehicle longitudinal direction. Moreover, on a rear face end region opposite to the bearing point, the control lever 14 includes a hook-type catch link 23 projecting into a trajectory of a control contour 24 of the drive carriage 15. The catch link 23 is obliquely oriented such that the control contour 24 of the drive carriage 15, in case of abutment on an oblique edge of the catch link 23, necessarily pivots the control lever 14 upwards, whereby the latching cam 19, which is fixedly disposed on the control lever 14 in the region of an underside thereof, is released from the latching recess 20 in the floor 10 of the guide rail arrangement 7.

Moreover, the control lever 14 includes a support roller 21 below the catch link 23, which roller is rotatably mounted by means of a bearing bolt in a bearing seat of the rear-sided face end region of the control lever 14. The support roller 21 is mounted on the control lever 14 for rotation about a rotational axis extending in the vehicle transverse direction and, thus, in parallel to a pivot axis of the control lever 14. The support roller 21 projects beyond a lower edge contour of the control lever 14 downwards such that the support roller 21, during rolling along on the floor 10 of the guide rail arrangement 7, holds the control lever 14 supported at a distance from the floor 10 of the guide rail arrangement 7. Said distance is selected such that upon supporting the control lever 14 on the floor 10 of the guide rail arrangement 7 by the support roller 21, the latching cam 19 is positioned contact-free at a short distance above the floor 10 of the lower guide plane 9 of the guide rail arrangement 7. Thus, if the support roller 21 rolls on the floor 10 of the guide rail arrangement 7, a contact surface of the support roller 21 is the only support surface on which the control lever 14 is in contact with the floor 10 of the guide rail arrangement 7. An underside of the latching cam 19 is positioned at a short distance above the floor 10 and likewise floats over the floor 10.

In order to allow a plunging movement of the latching cam 19 into the latching recess 20 of the floor 10 of the guide rail arrangement 7, regardless of the support roller 21, a seat 22 is provided in the floor 10 of the guide rail arrangement 7, into which seat the support roller 21 can plunge downwards. The seat 22 is provided at a distance in the longitudinal direction of the guide rail arrangement 7 behind the latching recess 20 in the floor 10 of the guide rail arrangement 7, which distance corresponds at least largely to the distance of the support roller 21 from the latching cam 19. While a seat contour of the latching recess 20 is matched at least largely in a form-fitting manner to an outer contour of the latching cam 19 of the control lever 14, the seat 22 is considerably greater than a cross sectional area of the support roller 21. The length and width of the seat 22 are dimensioned such that the support roller 21 together with a corresponding holding section of the rear-sided face end region of the control lever 14 can plunge into the seat 22 downwards, both in the transverse direction and in the longitudinal direction of the guide rail arrangement 7. A corresponding dimensioning of the seat 22 is apparent with reference to FIGS. 2 to 7, wherein the size proportions between the support roller 21, the control lever 14 and the seat 22 are true to scale.

When the carrier profile is to be transferred from a closed position of the roof part to a ventilation position, the drive carriage 15 is moved forwards in the guide rail arrangement 7. As a result, the slotted guide mechanism 17 necessarily urges the carrier profile 11 upwards via the control link 18, while the carrier profile 11 remains secured in the longitudinal direction of the guide rail arrangement 7 via the equalizing lever 13 and the bearing carriage 12. The bearing carriage 12 is blocked by the control lever 14 which is locked by means of its latching cam 19 in the latching recess 20 in the longitudinal direction. If the drive carriage 15 reverses its direction of movement, by the corresponding helix cable of the drive system being moved rearwards in the opposite direction, then the drive carriage 15 moves rearwards within the guide rail arrangement 7 and draws the carrier profile 11 necessarily downwards via the slotted guide mechanism 17 and the control link 18. Once, in the displacement direction, the front-sided control contour 24 of the drive carriage 15 has reached the catch link 23 of the control lever 14, the control lever 14 is necessarily driven upwards, whereby the latching cam 19 and the support roller 21 are released from the floor 10 of the guide rail arrangement 7. Now, a further shifting movement of the drive carriage 15 rearwards can entrain the control lever 14 and, thus, also the bearing carriage 12, whereby the carrier profile 11 is moved to its open position in which the movable roof part 2 is positioned below the stationary roof section 4. Therein, the support roller 21 rolls on the floor 10 of the guide rail arrangement 7. The latching cam 19 is carried freely (see FIG. 7A which diagrammatically shows the latching cam 19 in dotted lines). If, starting from the open position of the carrier profile 11, the drive carriage 15 is again moved forwards within the guide rail arrangement 7, then the drive carriage, first of all, entrains the carrier profile 11, until the latching cam 19 is plunged back into the latching recess 20. The drive carriage 15 is now free in relation to the control lever 14 and can be moved further forwards, until the carrier profile 11 has reached the closed position of the roof part 2, wherein the carrier profile 11 is pivoted upwards to a minor extent, in order to position the roof part 2 flush with the stationary roof section 4 in the roof opening portion of the roof frame module 3.

The invention claimed is:

1. Sliding roof system for an automotive vehicle including a movable roof part displaceable relative to a vehicle-fixed roof frame module between a closed position, a ventilation position and an open position, and a drive system including at least one carrier profile fixedly connected to the roof part for displacing the roof part, and which carrier profile is articulated to an equalizing lever on a front side, which lever is pivotably mounted on a front-sided bearing carriage and extends rearwards along a vehicle-fixed guide rail arrangement and is guided in a push guide of a drive carriage connected to a drive transmission arrangement, and which drive system includes a control lever mounted on a front side of the bearing carriage, entrainable by the drive carriage and extending rearwards along the guide rail arrangement, wherein the control lever includes a latching cam to be received in a latching recess of the guide rail arrangement in a form-fitting manner, wherein the control lever is provided with at least one support roller supported on a floor of the guide rail arrangement, and the floor of the guide rail arrangement includes a seat into which the support roller plunges when the latching cam is received in the latching recess.

2. The sliding roof system according to claim 1, wherein the support roller is dimensioned and mounted on the control lever such that the latching cam is positioned in contact-free relation with a boundary surface of the guide rail arrangement when the support roller is supported on the floor of the guide rail arrangement.

3. The sliding roof system according to claim 1, wherein the control lever has a catch link on an end side thereof, which link is provided for receiving a control contour of the drive carriage, and the support roller is disposed adjacent to the catch link in a region of an underside of the control lever.

4. The sliding roof system according to claim 1, wherein the support roller has a rubbery-elastic outer jacket.

5. The sliding roof system according to claim 4, wherein the support roller is rotatably mounted in a bearing seat of the control lever by a bearing bolt.

\* \* \* \* \*